United States Patent
Garland et al.

[11] Patent Number: 5,815,315
[45] Date of Patent: Sep. 29, 1998

[54] TRUCK MIRROR WIND SCOOP ASSEMBLY

[76] Inventors: Drew P. Garland; Brian P. Garland, both of P.O. Box 840, Suwanne, Ga. 30174; Tony Abee, Rte. 2 Box 1285 Barrett Pkwy., Dahlonega, Ga. 30533

[21] Appl. No.: 717,402

[22] Filed: Sep. 20, 1996

[51] Int. Cl.⁶ .............................. G02B 5/08; G02B 7/182; B60R 1/06
[52] U.S. Cl. ...................... 359/509; 359/507; 15/250.201
[58] Field of Search .................... 359/507, 509; 296/91; 15/250.003, 250.201

[56] References Cited

U.S. PATENT DOCUMENTS

| | | | |
|---|---|---|---|
| 2,758,509 | 8/1956 | Owens | 359/509 |
| 2,796,506 | 6/1957 | Lumbert | 359/509 |
| 3,059,540 | 10/1962 | Robinson . | |
| 3,455,624 | 7/1969 | Godfrey | 359/509 |
| 4,196,930 | 4/1980 | Busche | 296/91 |
| 4,538,851 | 9/1985 | Taylor | 296/15 |
| 4,550,988 | 11/1985 | Harder et al. | 359/509 |
| 4,577,929 | 3/1986 | Guillen | 350/283 |
| 4,718,755 | 1/1988 | Olson et al. | 359/509 |
| 4,869,581 | 9/1989 | Matulich | 359/509 |
| 4,878,707 | 11/1989 | Meyers | 296/91 |
| 4,979,809 | 12/1990 | Peters | 359/509 |
| 5,042,865 | 8/1991 | O'Saben | 296/91 |
| 5,150,941 | 9/1992 | Silzer et al. | 296/152 |

FOREIGN PATENT DOCUMENTS

| | | | |
|---|---|---|---|
| 1020576 | 2/1966 | United Kingdom | 359/509 |
| 2175552 | 12/1986 | United Kingdom | 359/509 |

*Primary Examiner*—Ricky D. Shafer
*Attorney, Agent, or Firm*—Isaf, Vaughan & Kerr

[57] ABSTRACT

An improve method and apparatus for removing beaded water from the reflective surface of a vehicle mirror is provided. The apparatus comprises a metal wind scoop assembly that is mounted to the mirror. The wind scoop assembly, together with the structure of the mirror, defines a windward facing intake scoop and an exhaust slot located adjacent the surface of the mirror. The inlet scoop intercepts an air stream created by movement of the vehicle and the stream is redirected and exhausted through the exhaust slot along the surface of the mirror. The exhausted stream blows beaded water from the mirror to clear and dry the mirror for better vision.

6 Claims, 2 Drawing Sheets

TRUCK MIRROR WIND SCOOP ASSEMBLY

TECHNICAL FIELD

The present invention relates generally to long haul trailer trucks and more particularly to a method and apparatus for clearing water beads from the surfaces of the large side view mirrors of such trucks during and immediately after a rain storm.

BACKGROUND OF THE INVENTION

The accumulation of water beads on the reflective surfaces of the large side view mirrors of long haul trailer trucks during a rain storm can significantly impair the effectiveness of such mirrors. This problem is particularly acute in dusty or dirty areas because dust and dirt can become embedded in the water droplets and become deposited on mirror surfaces as the droplets dry on such surfaces. In many instances, truck drivers are forced to pull off the road after a rain storm to clean their side view mirrors. Such stops, even though necessary in many instances, are highly undesirable because most truck drivers maintain a tight time schedule for delivery of their loads.

Attempts to prevent accumulation of water and debris on mirror surfaces have been made. U.S. Pat. No. 4,196,930 of Busche, for example, discloses a wind deflector system for preventing the accumulation of foreign matter on a motor vehicle side view mirror. Busche teaches the mounting of vertical and horizontal air deflectors in advance of a side view mirror to deflect the oncoming wind stream over and around the sides of the mirror. This, it is taught, deflects foreign matter such as ice, mud, snow, and the like away from the mirror so that the mirror surface remains clean for long periods of time while the vehicle is in motion.

While the Busche device may have some beneficial impact for deflecting mud and snow, it nevertheless is ineffective in preventing the accumulation of water beads on the reflective surface of the mirror. This is because rain water can still impact the leading or back surface of the mirror and migrate around to the front. In addition, water can splash onto the mirror surface from other parts of the vehicle where it is not affected by the diverted air streams created by the Busche deflectors. Further, when the truck comes to a stop, the wind deflectors of Busche become inoperative and rain that runs down the reflective surface of the mirror tends to stay there and bead up when the truck gets underway again.

Aerodynamic cowlings such as those shown in U.S. Pat. No. 5,150,941 of Silzer et al. have been proposed. While such cowlings may be of some use in preventing the build-up of water beads on side view mirrors, they nevertheless exhibit many of the same problems as the Busche device described above. This is particularly true when a vehicle is at rest in a rain storm, where the cowlings, like the wind deflectors of Busche, are inoperative. Further, such cowlings, even if effective, are not suitable for use with the large rectangular side view mirrors of long hall trailer trucks.

Accordingly, there exists a continuing need for an efficient and effective method and apparatus for clearing the side view mirrors of trailer trucks of water beads and other debris that can accumulate on mirror's surface during a rain storm. It is to the provision of such a method and apparatus that the present invention is primarily directed.

SUMMARY OF THE INVENTION

Briefly described, the present invention, in one preferred embodiment thereof, comprises an apparatus for directing a stream of air across the reflective surface of the side view mirror of a trailer truck to blow beaded water off of the mirror. The apparatus comprises a formed metal body or cowling that is adapted to be attached to an existing side view mirror of a trailer truck. The cowling is configured to define, in conjunction with the body of the mirror itself, an inlet scoop portion that extends beyond the outside edge of the mirror facing into the wind and an exhaust nozzle portion shaped to direct an air stream collected by the scoop portion laterally across the reflective surface of the mirror. In the preferred embodiment, the cowling is contoured so that a collected air stream encounters a progressively narrowing passageway as it moves from the inlet scoop to the exhaust nozzle. In this way, the stream is made more laminar and its velocity is increased prior to being blown across the surface of the mirror. This, in turn, keeps the stream close to the mirror surface as it moves thereacross to capture and blow beads of water therefrom. When the rain is over, the air stream continues to blow across the mirror's surface as the truck moves along the highway to dry the mirror quickly and efficiently.

It is thus an object of the invention to provide a efficient and effective method and apparatus for clearing the reflective surfaces of side view truck mirrors of beaded water during rain storms.

It is another object of the invention to provide a method and apparatus for drying the surface of a side view truck mirror quickly after a rain storm.

A further object of the invention is to provide a device for clearing the surface of a side view truck mirror of water that is simple in construction and operation, unobtrusive in use, easily attached to a wide variety of existing mirrors, and that functions automatically without attention from a truck driver.

These and additional objects, features, and advantages of the present invention will become more apparent upon review of the detailed description set forth below when taken in conjunction with the accompanying drawings, which are briefly described as follows.

DETAILED DESCRIPTION OF THE PREFERRED EMBODIMENT

Figure 1:
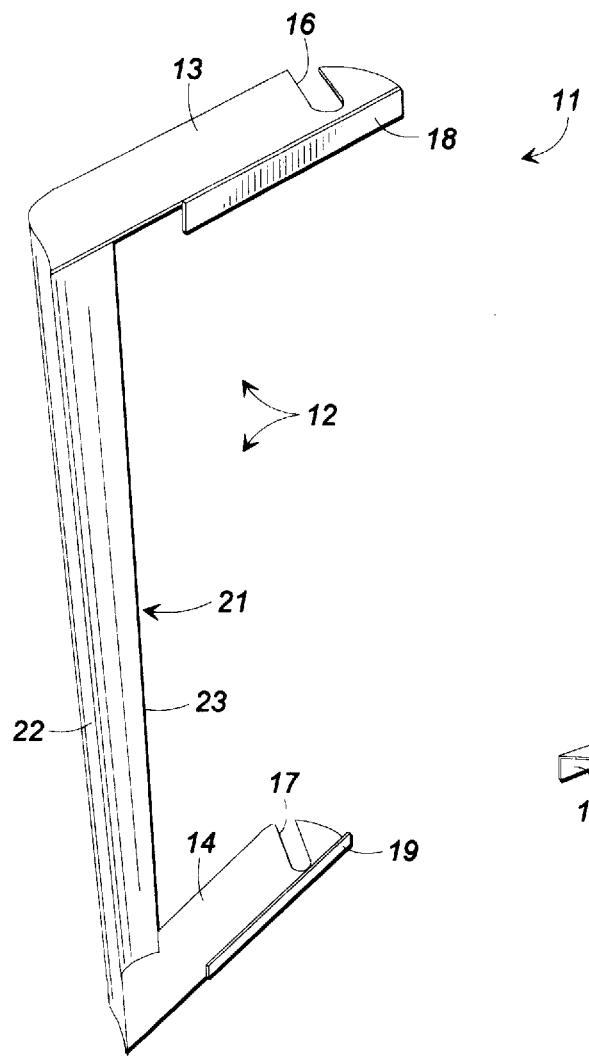
FIG. 1 is a perspective view illustrating a preferred embodiment of a wind scoop cowling for attachment to a side view mirror of a trailer truck.
Figure 2:
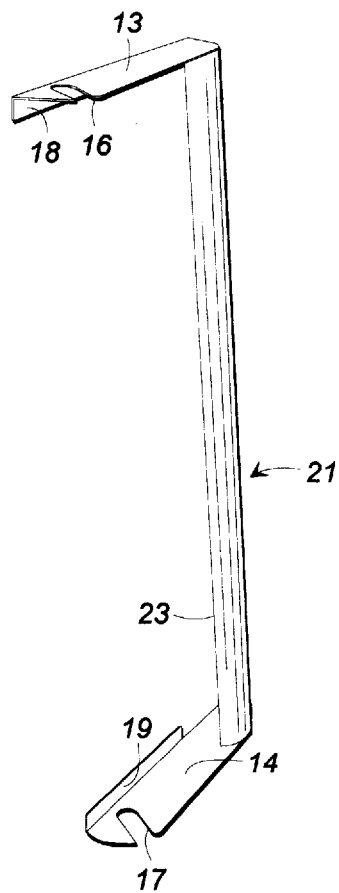
FIG. 2 is a perspective view of the wind scoop cowling of FIG. 1 illustrated from a different viewing angle.

Referring now in more detail to the drawing figures, wherein like numerals refer to like parts throughout the several views; FIGS. 1 and 2 illustrate a preferred embodiment of the wind scoop assembly of the present invention. The assembly 11 comprises a body 12 that preferably is formed from 16 gauge cold-rolled steel sheeting that has been stamped and bent to the shape illustrated in the drawings. All edges of the steel are preferable broken and the entire assembly can be chrome plated if desired to present an aesthetically pleasing appearance and to guard against rust and corrosion.

The body 12 is formed with an upper arm 13 and a lower arm 14, which extend laterally inwardly from the top and bottom ends of a contoured cowling 21. The upper arm 13 is formed with a mounting slot 16 for securing the assembly to the side view mirror of a trailer truck as described in more detail below. An upper stabilizing flange 18 depends from the forward facing edge of the upper arm 13 and is positioned to stabilize the assembly when it is mounted to a mirror. Likewise, the lower arm 14 is formed with a mounting slot 17 and a stabilizing flange 19 that serve the same purposes as slot 16 and flange 18.

An elongated vertically extending contoured cowling 21 extends between the outside ends of the upper and lower arms as illustrated. The cowling 21 has an inside vertical edge 23 and outside vertical edge 22. The cowling 21 is formed with a curving contoured shape extending from the outside vertical edge 22 to the inside vertical edge 23. This shape of the cowling 21 together with the outside edge portion of a side view mirror to which the assembly is mounted defines a windward facing scoop for collecting a wind stream as the truck moves along the road and a vertically slotted exhaust that modifies the wind stream and redirects it across the reflective front surface of the mirror to blow beaded water and other debris from the mirror.

Figure 3:
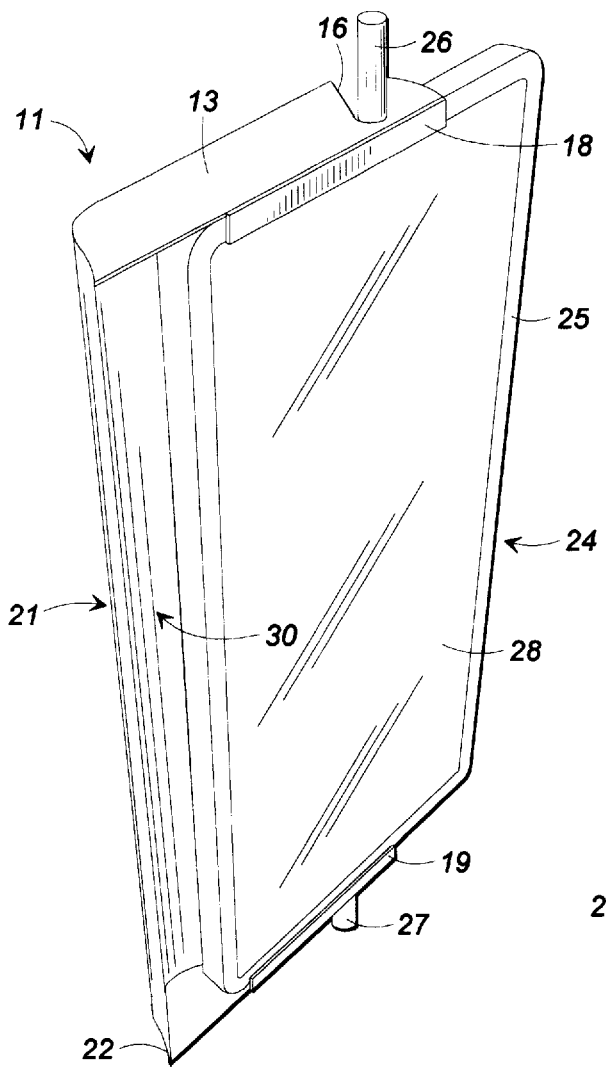
FIG. 3 is a perspective view of the wind scoop cowling of FIG. 1 shown attached to a side view mirror and as seen from the back or windward side of the mirror structure.
Figure 4:
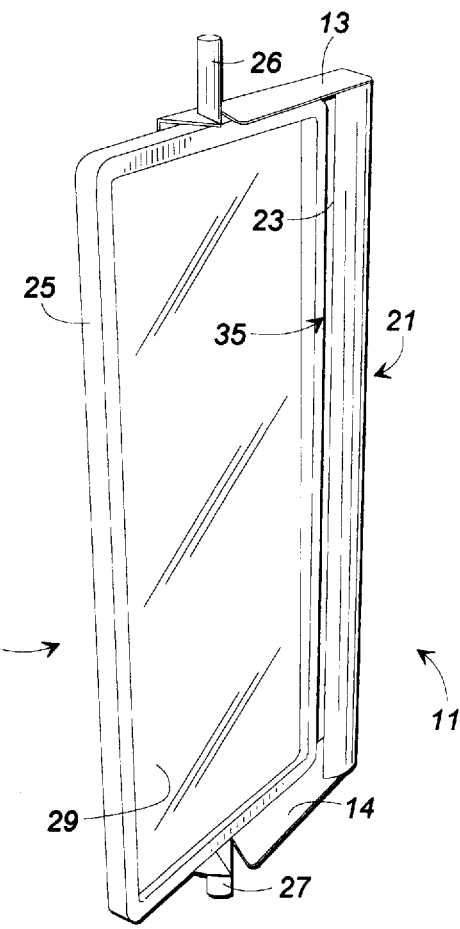
FIG. 4 is a perspective view of the wind scoop cowling of FIG. 1 shown attached to a side view mirror and as seen from the front or reflective side of the mirror.

FIGS. 3 and 4 illustrate the wind scoop assembly of this invention attached to a typical side view mirror assembly 24 of a trailer truck. Although such mirror assemblies can differ somewhat in specific structure and function, most are generally rectangular in shape with parallel vertical side edges and horizontal parallel top and bottom edges and have a front or windward facing surface 28 (FIG. 3) and a rearward facing reflective surface 29 (FIG. 4). The mirror can be framed in a metal bezel 25 and, in some cases, the front windward facing surface 28 is formed with a curved or bulging shape (not shown). An upper mounting rod 26 projects upwardly from the top edge of the mirror assembly and a similar lower mounting rod 27 projects downwardly from the bottom edge of the assembly. The mounting rods are adapted to be received in the mounting receptacles of an appropriate frame that, in turn, secures the mirror assembly to the body of a truck cab just outside the side windows thereof. The entire mirror assembly is pivotable on its top and bottom mounting rods so that it can be adjusted for drivers of different stature.

The wind scoop assembly 11 is seen in FIGS. 3 and 4, attached to the mirror assembly for use. More specifically, the scoop assembly is mounted to the mirror assembly with its top and bottom arms 13 and 14 extending partially along the top and bottom edges respectively of the mirror assembly. The upper mounting rod 26 of the mirror assembly is received in the upper arm slot 16 with the upper stabilizing flange 18 of the upper arm resting against the bezel 25 on the windward side of the mirror assembly. Although not completely visible in FIGS. 3 and 4 the lower arm 14, lower arm slot 17, and lower stabilizing flange 19 are similarly disposed with respect to the bottom edge and lower mounting rod of the mirror assembly. In this way, the wind scoop assembly is easily attached to the mirror assembly without special tools or disassembly, although a top and bottom nut or sheet metal screw can be used if desired to hold the scoop assembly securely in place.

With the wind scoop assembly attached to the mirror assembly as described, the vertically extending contoured cowling 21 is disposed along the outside edge of the mirror. As best seen in FIG. 3, in this position, the cowling, in conjunction with the edge portion of the mirror assembly, forms a windward facing scoop 30 that is configured as a wind intake when the truck is moving in a forward direction. The contoured cowling extends from its outside edge 22 in a curved pattern around to its inside edge 23, which is positioned adjacent to, spaced from, and parallel to the reflective front side 29 of the mirror assembly.

The air passageway formed by the cowling on one side and the mirror edge portion on the other side is narrower along its exit or exhaust slot 35 than along its intake slot 30. In this way, an air stream intercepted by the scoop 30 is compressed and speeds up as it moves through the passageway and is ejected through the exhaust slot onto the mirror's surface. The narrowing passageway also tends to insure an air stream issuing from the exhaust slot that is more laminar rather than a turbulent in nature. In operation, the laminar flow of air tends to stay close to the surface of the mirror as it moves across the mirror for better removal of water beads and droplets from the mirror.

Figure 5:
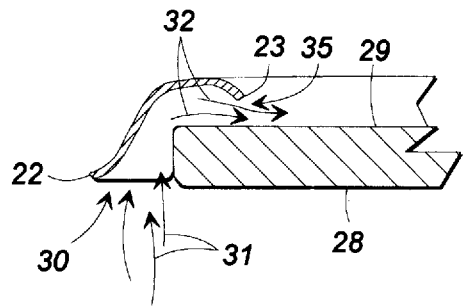
FIG. 5 is a cross sectional view illustrating the configuration of the scoop and its function in directing a wind stream across the mirror surface during operation.

FIG. 5 illustrates the passageway formed by the cowling and the edge portion of the mirror assembly and illustrates the flow of an air stream into the intake scoop 30 and through the passageway to be ejected through the exhaust slot 35 along the surface of the mirror 29. As seen if FIG. 5, the intake scoop 30 intercepts an air stream 31 generated by the motion of a truck on which the assembly is installed. As the air stream 31 enters the scoop 30 and moves through the passageway to the exhaust slot 35, it encounters a narrowing passageway with the exhaust slot 35 being significantly narrower than the scoop 30. Thus, as the air stream moves through the passageway, it increases in speed and becomes more uniform and laminar when it exits at the exhaust slot 35. In this way, the air stream 32 is ejected at relatively high speed in a direction extending along the surface of the mirror. The laminar nature of the flow tends to insure that the flow stays close to the surface of the mirror as it blows thereacross. In this way, beaded water collected on the mirror is effectively and efficiently blown away by the air stream 32. Further, when the rain stops, the continuing air stream helps to dry the surface of the mirror quickly and efficiently so that water beads and droplets do not impair the driver's vision or collect air borne dirt and dust that is then left on the mirror as a film.

The invention has been described herein in terms of preferred embodiments and methodologies that are considered by the inventor to be the best mode of carrying out his invention. It will be obvious to those of skill in this art, however, that various modifications to the illustrated embodiment might well be made within the scope of the invention. For example, mounting means other than the arms disclosed herein might be used as long as the scoop is appropriately positioned to direct its stream of air across the mirror's surface. Materials other than cold-rolled steel might be used and the scoop assembly could be formed from separate parts rather than pressed and bent as a unitary metal structure. These and other additions, deletions, and modifications might well be made to the embodiments illustrated herein without departing from the spirit and scope of the invention as set forth in the claims.

We claim:

1. A wind scoop assembly for directing an air stream across a reflective surface of a side view mirror assembly attached to a vehicle to remove beaded water from the reflective surface as the vehicle moves in a forward direction, the side view mirror assembly including a windward surface opposite the reflective surface, a side edge portion, an upper mounting rod, and a lower mounting rod, said assembly comprising:

an upper arm having a distal end and a proximal end and defining an upper arm slot adjacent the proximal end for slidably mounting said upper arm to the upper mounting rod;

a lower arm spaced from said upper arm, said lower arm having a distal end and a proximal end and defining a lower arm slot adjacent the proximal end for slidably mounting said lower arm to the lower mounting rod;

an elongate contoured cowling extending between and attached to the distal ends of said upper and lower arms, said cowling having an elongate outside edge, an opposed elongate inside edge, and a curvilinear body portion therebetween, said cowling being constructed and arranged to define an intake scoop between the outside edge and a side edge portion of the mirror assembly, an exhaust slot between the inside edge and the reflective surface of the mirror assembly, and a progressively narrowing air passageway passing from the intake scoop to the exhaust slot for increasing the velocity of the air stream passing therethrough as the vehicle moves in the forward direction;

a first flange depending from said upper arm for bearing against the windward surface of the mirror assembly; and a second flange depending from said lower arm for bearing against the windward surface of the mirror assembly;

wherein said first and second flanges stabilize said assembly on the mirror assembly and wherein said first and second flanges maintain said cowling in a fixed position with respect to the mirror assembly as the vehicle moves in a forward direction.

2. The assembly as claimed in claim 1 wherein the exhaust slot is narrower than the intake scoop.

3. The assembly as claimed in claim 1 wherein the outside edge of said cowling is curved away from the side edge portion of the mirror assembly to maximize air stream intake, and wherein the inside edge of said cowling is curved toward the reflective surface of said mirror assembly to minimize turbulence as the air stream exit the exhaust slot.

4. The assembly as claimed in claim 1 wherein the upper arm slot is open at the periphery of said upper arm and wherein the lower arm slot is open at the periphery of said lower arm.

5. The assembly as claimed in claim 1 wherein said upper arm and said first flange are planar, and wherein said first flange forms a right angle with respect to said upper arm.

6. The assembly as claimed in claim 1 wherein said lower arm and said second flange are planar, and wherein said second flange forms a right angle with respect to said lower arm.

\* \* \* \* \*